(12) United States Patent
Weksler et al.

(10) Patent No.: US 10,019,703 B2
(45) Date of Patent: Jul. 10, 2018

(54) VERIFYING A SECURE CONNECTION BETWEEN A NETWORK BEACON AND A USER COMPUTING DEVICE

(71) Applicant: GOOGLE INC., Mountain View, CA (US)

(72) Inventors: Michel Weksler, El Cerrito, CA (US); Yassir Abousselham, Walnut Creek, CA (US)

(73) Assignee: GOOGLE LLC, Mountain View, CA (US)

( * ) Notice: Subject to any disclaimer, the term of this patent is extended or adjusted under 35 U.S.C. 154(b) by 713 days.

(21) Appl. No.: 14/604,654

(22) Filed: Jan. 23, 2015

(65) Prior Publication Data

US 2015/0332248 A1 Nov. 19, 2015

Related U.S. Application Data

(60) Provisional application No. 61/992,855, filed on May 13, 2014.

(51) Int. Cl.
*G06Q 20/00* (2012.01)
*G06Q 20/32* (2012.01)
(Continued)

(52) U.S. Cl.
CPC ....... *G06Q 20/3224* (2013.01); *G06Q 20/325* (2013.01); *G06Q 20/3226* (2013.01);
(Continued)

(58) Field of Classification Search
CPC .. G06Q 20/40; G06Q 20/405; G06Q 20/3224; G06Q 20/3226; H04W 12/12; H04W 88/02
See application file for complete search history.

(56) References Cited

U.S. PATENT DOCUMENTS 6,414,955 B1 7/2002 Clare et al.
6,961,541 B2 * 11/2005 Overy ................ H04L 63/0492
380/247

(Continued)

FOREIGN PATENT DOCUMENTS

CN 1783810 A 6/2006
CN 101099134 A 1/2008
(Continued)

OTHER PUBLICATIONS

Hao Han et al., A timint-based Scheme for Rogue AP Detection, IEEE Transaction on Parallel and Distribution System, Nov. 2011, vol. 22, No. 11, pp. 1912-1925.*

(Continued)

*Primary Examiner* — Steven S Kim
(74) *Attorney, Agent, or Firm* — Johnson, Marcou & Isaacs, LLC

(57) ABSTRACT

A beacon device establishes a network connection with a user computing device. The beacon device determines the received signal strength indicator of the user computing device (the "reverse RSSI") and transmits it to the user computing device, which determines the received signal strength indicator (the "RSSI") of the beacon device, and saves the RSSI with the reverse RSSI as a data pair. At a later time, the beacon device determines a subsequent reverse RSSI and transmits it to the user computing device, which determines a subsequent RSSI, and saves the subsequent RSSI with the subsequent reverse RSSI as a data pair. If the user computing device determines a correspondence in the changes of the RSSI values and reverse RSSI values in the two data pairs, a transaction between the two devices is allowed. If correspondence does not exist, then the user computing device terminates the network connection.

20 Claims, 6 Drawing Sheets

(51) Int. Cl.
   *H04W 12/10* (2009.01)
   *H04W 12/02* (2009.01)
   *H04W 40/24* (2009.01)
   *G06Q 20/38* (2012.01)
   *H04W 24/08* (2009.01)
   *H04W 12/12* (2009.01)
   *H04W 88/02* (2009.01)
   *H04W 4/00* (2018.01)

(52) U.S. Cl.
   CPC ..... *G06Q 20/3278* (2013.01); *G06Q 20/3829* (2013.01); *H04W 12/02* (2013.01); *H04W 12/10* (2013.01); *H04W 12/12* (2013.01); *H04W 24/08* (2013.01); *H04W 40/244* (2013.01); *H04W 4/008* (2013.01); *H04W 88/02* (2013.01)

(56) References Cited

U.S. PATENT DOCUMENTS

| | | | |
|---|---|---|---|
| 7,228,142 B2* | 6/2007 | Natori | G08B 13/1427 455/41.2 |
| 8,320,562 B2* | 11/2012 | Hammond | H04L 9/0838 380/44 |
| 8,750,267 B2* | 6/2014 | Aggarwal | H04L 63/1466 370/338 |
| 8,805,403 B2* | 8/2014 | Curticapean | H04W 64/003 370/252 |
| 8,836,489 B2* | 9/2014 | Christensen | B60R 25/102 340/426.1 |
| 8,856,045 B1* | 10/2014 | Patel | G06Q 20/3823 705/64 |
| 9,621,579 B2* | 4/2017 | Casaburi | H04L 63/145 |
| 2003/0220765 A1 | 11/2003 | Overy et al. | |
| 2003/0232598 A1 | 12/2003 | Aljadeff et al. | |
| 2004/0008663 A1 | 1/2004 | Srikrishna et al. | |
| 2004/0264388 A1 | 12/2004 | Rover et al. | |
| 2005/0036487 A1 | 2/2005 | Srikrishna | |
| 2006/0068811 A1* | 3/2006 | Adya | H04W 12/12 455/456.2 |
| 2006/0193299 A1* | 8/2006 | Winget | H04L 63/0492 370/338 |
| 2006/0245442 A1 | 11/2006 | Srikrishna et al. | |
| 2007/0298720 A1* | 12/2007 | Wolman | H04L 63/1408 455/66.1 |
| 2008/0070563 A1 | 3/2008 | Adya et al. | |
| 2009/0085769 A1 | 4/2009 | Thubert et al. | |
| 2009/0175238 A1 | 7/2009 | Jetcheva et al. | |
| 2010/0115272 A1 | 5/2010 | Batta | |
| 2010/0172259 A1 | 7/2010 | Aggarwal et al. | |
| 2012/0322391 A1 | 12/2012 | Suzuki | |
| 2013/0010617 A1* | 1/2013 | Chen | H04W 64/00 370/252 |
| 2013/0252587 A1* | 9/2013 | Ko | H04W 48/18 455/411 |
| 2013/0273938 A1 | 10/2013 | Ng et al. | |
| 2014/0030982 A1 | 1/2014 | Cardona | |
| 2015/0004974 A1* | 1/2015 | Karimi-Cherkandi | H04W 48/16 455/435.2 |
| 2015/0172991 A1 | 6/2015 | Petersen et al. | |
| 2015/0223145 A1* | 8/2015 | Yoon | H04W 48/04 370/328 |
| 2015/0334569 A1 | 11/2015 | Rangarajan et al. | |
| 2015/0334676 A1 | 11/2015 | Hart et al. | |
| 2015/0341331 A1 | 11/2015 | Weksler et al. | |
| 2016/0006848 A1 | 1/2016 | Halvarsson | |
| 2016/0019512 A1* | 1/2016 | Buchheim | G06Q 20/227 705/73 |
| 2017/0019788 A1 | 1/2017 | Weksler et al. | |

FOREIGN PATENT DOCUMENTS

| | | | | |
|---|---|---|---|---|
| CN | 102273174 A | 12/2011 | | |
| EP | 2 381 719 A1 | 10/2011 | | |
| JP | 2006-526940 A | 11/2006 | | |
| JP | 2008-294694 A | 12/2008 | | |
| JP | 2010-273205 A | 12/2010 | | |
| JP | 2012-175518 A * | 11/2011 | | |
| JP | 1011-229061 A * | 9/2012 | | |
| WO | 2006093634 A1 | 9/2006 | | |
| WO | WO2006/093634 A1 * | 9/2006 | ............. | G06F 11/00 |
| WO | 2008/059882 A1 | 5/2008 | | |
| WO | 2010078578 A2 | 7/2010 | | |
| WO | WO2010/078578 A2 * | 7/2010 | ............ | H04W 12/12 |
| WO | 2010/133634 A1 | 11/2010 | | |
| WO | 2015/175222 A1 | 11/2015 | | |
| WO | 2015/179090 A1 | 11/2015 | | |

OTHER PUBLICATIONS

Murat Demirbas et al., An RSSI'based Scheme for Sybil Attack Detection in Wireless Sensor Networks, World of Wireless, Mobile and Multimedia Networks, 2006. WoWMoM 2006. International Symposium Jun. 2006.*

Barrio Baranano, "International Search Report and Written Opinion issued in International Application No. PCT/US2015/028304 filed Apr. 29, 2015", dated Jul. 13, 2015, 1-17.

Demirbas, et al., "An RSSI-based Scheme for Sybil Attack Detection in Wireless Sensor Networks", Proceedings of the 2006 International Symposium on a Worl of Wireless, Mobile and Multimedia Networks, XP010925920, Jun. 26, 2006, 564-570.

Han, et al., "A Timing-Based Scheme for Rogue AP Detection", IEEE Transactions on Parallel and Distributed Systems, vol. 22, No. 11, Nov. 1, 2011, 1912-1925.

Koestel, "ISRWO issued in International Application No. PCT/US2015/028298 filed Apr. 29, 2015", dated Sep. 4, 2015, 1-12.

Akyildiz, et al., "A Survey on Wireless Mesh Networks", In IEEE Communications Magazine, vol. 43, No. 9, Sep. 2005, 8 pages.

Alrajeh, et al., "Intrusion Detection Systems in Wireless Sensor Networks: A Review", International Journal of Distributed Sensor Networks, vol. 2013, Article ID 167575, May 19, 2013, 8 pages.

Bai, "International Preliminary Report on Patentability issued in International Application No. PCT/US2015/028304", dated Nov. 24, 2016, 13 pages.

Moon, "International Preliminary Report on Patentability issued in International Application No. PCT/US2015/028298", dated Dec. 8, 2016, 9 pages.

Lagor, "U.S. Office Action issued in copending U.S. Appl. No. 15/280,655, filed Sep. 29, 2016", dated Mar. 24, 2017, 8 pages.

Siddiqui, "Canada Office Action received for Canada Patent Application No. 2,949,052", dated May 2, 2017, 4 pages.

"Chinese Office Action issued in Chinese Application No. 201580035244.6", dated Jun. 22, 2017, 5 pages of English Translation and 5 pages of Chinese Office Action.

Maloney, "Australian Office Action issued in Australian Application No. 2015259667", dated Jul. 13, 2017, 7 pages.

Taebeom, et al., "Online Detection of Fake Access Points using Received Signal Strengths", IEEE 75th Vehicular Technology Conference, May 6-9, 2012, 5 pages.

Lee, "Korean Office Action issued in Korean Application No. 10-2016-7034780", dated Aug. 9, 2017, 3 pages of English Translation and 3 pages of Korean Office Action.

Kuji, "Japanese Office Action issued in Japanese Application No. 2016-576085", dated Jun. 12, 2017, 2 pages of English Translation and 2 pages of Japanese Office Action.

Chinese Patent Office, "Chinese Office Action issued in Chinese Application No. 201580035244.6", dated Dec. 13, 2017, 03 pages of English Translation and 03 pages of Chinese Office Action.

Haoka, "Japanese Office Action issued in Japanese Application No. 2016-567723", dated Nov. 13, 2017, 6 pages of English Translation and 5 pages of Korean Office Action.

Lee, Korean Office Action issued in Korean Application No. 10-2016-7034780, dated Feb. 8, 2018, 3 pages of English Translation and 3 pages of Korean Office Action.

Maloney, "Australian Office Action issued in Australian Application No. 2015259667", dated Feb. 13, 2018, 2 pages.

(56) References Cited

OTHER PUBLICATIONS

Prasai, "Australian Office Action issued in Australian Application No. 2017201673", dated Mar. 29, 2018, 4 pages.
Atkinson; "Canada Office Action received for Canada Patent Application No. 2949052", dated Apr. 13, 2018, 4 pages.
Lagor, "U.S. Office Action issued in copending U.S. Appl. No. 15/868,006, filed Jan. 11, 2018," dated May 1, 2018, 8 pages.

* cited by examiner

VERIFYING A SECURE CONNECTION BETWEEN A NETWORK BEACON AND A USER COMPUTING DEVICE

RELATED APPLICATION

This patent application claims priority under 35 U.S.C. § 119 to U.S. Patent Application No. 61/992,855, filed May 13, 2014 and entitled "Verifying a Secure Connection between a Network Beacon and a User Computing Device." The entire contents of the above-identified application are hereby fully incorporated herein by reference.

TECHNICAL FIELD

The present disclosure relates generally to wireless network connections, and more particularly to securing wireless network connections.

BACKGROUND

Wireless beacons, such as Bluetooth low energy beacons, are inexpensive devices that a merchant can install in a merchant location. Wireless beacons may communicate advertising ("ADV") packets to user computing devices, such as smartphones and tablets that are within signal range. Wireless beacons may be placed in a merchant system near or within a point of sale ("POS") terminal. Establishing a network connection with a wireless beacon may indicate to a user computing device that it is near the merchant POS terminal. A user computing device may be configured to allow a transaction resulting in the transfer of user financial account information when it is near a POS terminal.

In certain situations, network connections between wireless beacons and user computing devices should be secure. For example, a third party may move a wireless beacon so that the user computing device allows a transaction, determining that it is near the POS terminal when it actually is not. In another example, moving a wireless beacon may compromise the security of a door lock application. Additionally, user financial account information may be compromised by a third party moving a wireless beacon and replacing it with a third party device, which intercepts and retransmits communications between the wireless beacon and the user computing device.

Conventional technologies do not determine the security of a network connection between a merchant beacon device and a user computing device.

SUMMARY

Techniques herein provide a computer-implemented method to determine the security of a network connection between a merchant beacon device and a user computing device by determining a correspondence over time between the received signal strength indicator ("RSSI") values of each device as measured by the other device. In an example embodiment, the merchant beacon device establishes a network connection with the user computing device. The merchant beacon device determines the RSSI of the user computing device (the "reverse RSSI") and transmits a data packet comprising the reverse RSSI to the user computing device. The user computing device determines the RSSI of the merchant beacon device, pairs the RSSI of the merchant beacon device with the reverse RSSI, and saves the RSSI data pair. At a later time, the merchant beacon device determines a subsequent reverse RSSI and transmits a subsequent data packet comprising the subsequent reverse RSSI to the user computing device. The user computing device determines a subsequent RSSI of the merchant beacon device, pairs the subsequent RSSI of the merchant beacon device with the subsequent reverse RSSI, and saves the subsequent RSSI data pair. The user computing device determines if a correspondence exists in the changes of the RSSI values and reverse RSSI values of the RSSI data pair and the subsequent RSSI data pair. If a correspondence exists, then the user computing device determines that the network is secure and allows a transaction between the user computing device and a merchant system associated with the merchant beacon device. If correspondence does not exist, then the user computing device determines that the network is insecure and terminates the network connection.

In certain other example aspects described herein, a system and a computer program product to determine the security of a network connection between a merchant beacon device and a user computing device by determining a correspondence over time between the RSSI values of each device as measured by the other device are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
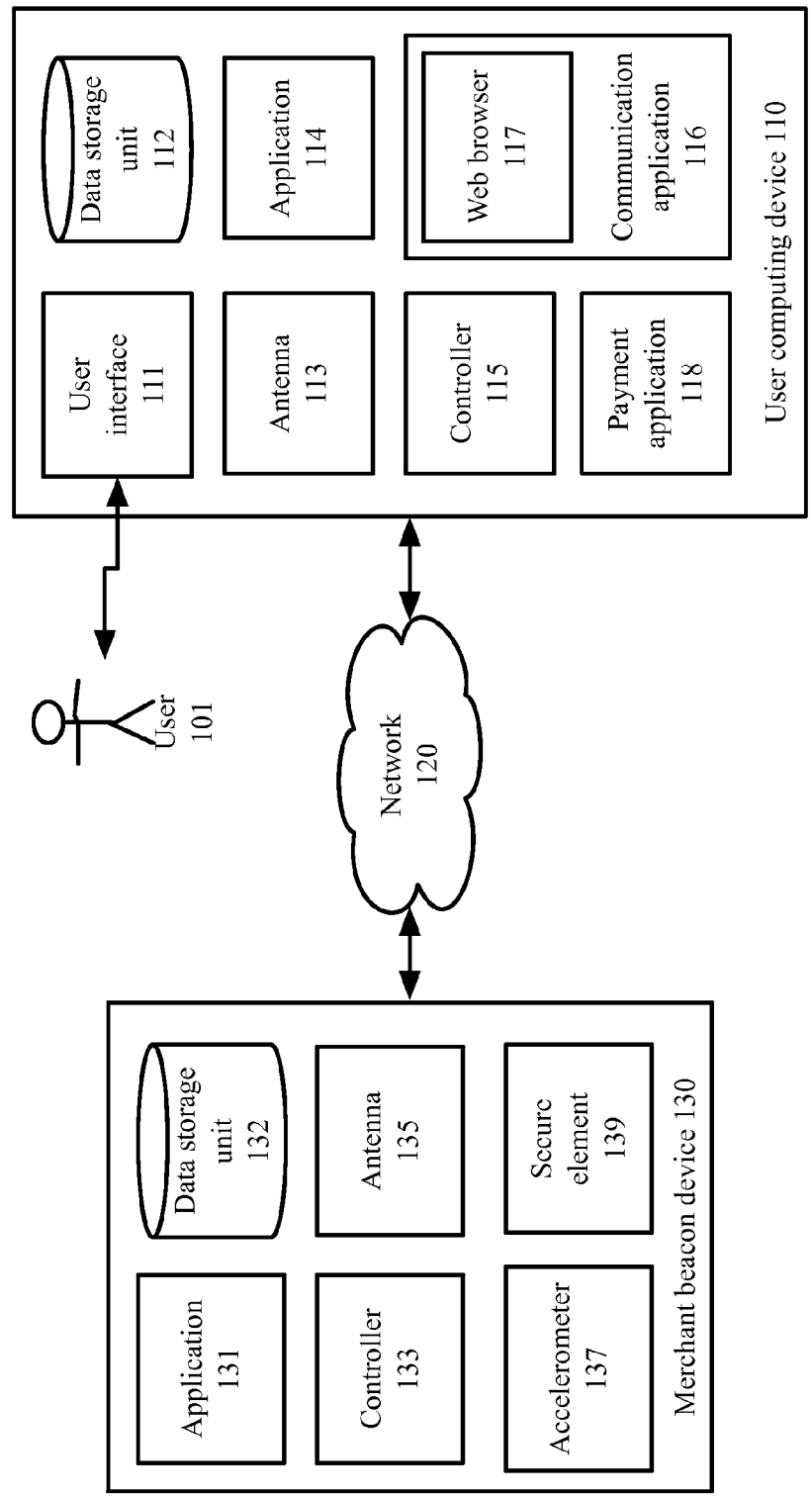
FIG. 1 is a block diagram depicting a system for determining the security of a wireless network connection, in accordance with certain example embodiments.

The example embodiments described herein provide computer-implemented techniques for determining the security of a network connection between a merchant beacon device and a user computing device by correlating the received signal strength indicator ("RSSI") of each device over time. In an example embodiment, the merchant beacon device establishes a network connection with the user computing device. The merchant beacon device determines the received signal strength indicator of the user computing device (the "reverse RSSI") and transmits a data packet comprising the reverse RSSI to the user computing device. The user computing device determines the RSSI of the merchant beacon device, pairs the RSSI of the merchant beacon device with the reverse RSSI, and saves the RSSI data pair. At a later time, the merchant beacon device determines a subsequent reverse RSSI and transmits a subsequent data packet comprising the subsequent reverse RSSI to the user computing device. The user computing device determines a subsequent RSSI of the merchant beacon device, pairs the subsequent RSSI of the merchant beacon device with the subsequent reverse RSSI, and saves the subsequent RSSI data pair. The user computing device determines if a correspondence exists between in the changes of the RSSI values and reverse RSSI values of the two most recent RSSI data pairs. If a correspondence exists, then the user computing device determines that the network is secure and allows a transaction between the user computing device and a merchant system associated with the merchant beacon device. If a correspondence does not exist, then the user computing device determines that the network is insecure and terminates the network connection or performs any other suitable action.

In an example embodiment, a merchant beacon device and a user computing device establish a network connection. For example, the network connection comprises a Bluetooth, Bluetooth low energy, Wi-Fi, or other appropriate network connection. In an example embodiment, the user computing device and the merchant beacon device exchange probe requests. For example, the merchant beacon device transmits a network connection request to the user computing device. And, the user computing device accepts the network connection request, establishing a network connection.

In an example embodiment, the merchant beacon device determines the RSSI of the user computing device (the "reverse RSSI"). For example, an RSSI is a measurement of the strength of a received signal from another device. The merchant beacon device transmits data comprising the reverse RSSI to the user computing device. For example, the merchant beacon device transmits an advertising data packet ("ADV packet") to the user computing device comprising the reverse RSSI. The user computing device receives the data comprising the reverse RSSI. The user computing device determines the RSSI of the merchant beacon device.

In an example embodiment, the user computing device pairs the RSSI of the merchant beacon device with the reverse RSSI and saves the RSSI data pair. In an example embodiment, the RSSI data pair comprises the time at which the RSSI of the merchant beacon device is determined. If more than one saved RSSI data pair exists, the user computing device determines if the network connection is secure. If more than one saved RSSI data pair does not exist, the user computing device receives a subsequent reverse RSSI from the merchant beacon device at a later time, detects a subsequent RSSI of the merchant beacon device, pairs the subsequent reverse RSSI with the subsequent RSSI of the merchant beacon device, and saves the subsequent RSSI data pair.

The user computing device determines if the network connection is secure. The user computing device extracts the two most recent RSSI data pairs and determines if a correspondence does exist between the RSSI data pairs. In an example, the two most recent RSSI data pairs were paired and saved at time A and time B. In the example, if the reverse RSSI increased at time B with respect to time A, the increase in the RSSI at time B with respect to time A is determined from the data pair. In this example, a correspondence between the two RSSI data pairs would comprise an increase in the RSSI proportional to the increase in the reverse RSSI between time A and time B. In another example, if the reverse RSSI is the same at time B that it was at time A, then the stability of the RSSI from time A to time B is determined. In this example, a correspondence between the two RSSI data pairs would comprise a stability in the RSSI between time A and time B or a small change within a margin of measurement error or below a configured threshold. If there is no correspondence between the two or more most recent RSSI data pairs, the user computing device determines that the network connection is insecure and terminates the network connection. If a correspondence does exist between the two or more most recent RSSI data pairs, the user computing device determines that the network connection is secure and may allow a transaction with a merchant system associated with the merchant beacon device. For example, the user computing device comprises a setting wherein a transaction with a merchant system is allowed only when the user computing device is in a secure network connection with a merchant beacon device associated with the merchant system.

In certain example embodiments, the RSSI data pairs further correspond to movement data logged by an accelerometer resident on the user computing device. For example, the accelerometer can detect movement of the user computing device between the time that the first RSSI is determined by the user computing device and the time that the second reverse RSSI is determined by the merchant beacon device. If a network connection is secure, any detected change in position and direction of movement of the user computing device should correspond to the changes in the RSSI values and reverse RSSI values between the two or more most recently recorded RSSI data pairs. In an example embodiment, the user computing device determines if the detection of movement of the accelerometer corresponds to the changes in the RSSI values and reverse RSSI values between the two or more most recently recorded RSSI data pairs.

In certain example embodiments, the data comprising the reverse RSSI sent by the merchant beacon device to the user computing device further comprises an encrypted digital signature created via a private key. The user computing device may further verify the validity of the merchant beacon device by decrypting the digital signature using a public key to verify that the merchant beacon device is associated with the merchant system. In an example embodiment, the user computing device receives the public key as part of a digital certificate from the merchant beacon device when a network connection is established. The user computing device can terminate the network connection with the merchant beacon device based on a determination that the digital signature is not associated with a merchant system with which the user intends to transact.

In an example embodiment, if the network connection is secure and the user computing device does not participate in a transaction with the merchant system, the network connection may be maintained for a configured period of time or indefinitely. In this example embodiment, the user computing device may periodically verify the security of the network connection by receiving a subsequent reverse RSSI from the merchant beacon device, determining a subsequent RSSI of the merchant beacon device, pairing the subsequent RSSI to the subsequent reverse RSSI, saving the subsequent RSSI data pair, extracting the two or more most recent RSSI data pairs, and determining if the two or more most recent RSSI data pairs correspond. In an example, if the network connection is determined to be secure, the network connection may still be terminated by the user computing device based on user computing device settings, by the user selecting to terminate the network connection on the user computing device, or when the user computing device leaves a necessary proximity with the merchant beacon required to maintain a network connection.

Example System Architecture

Turning now to the drawings, in which like numerals indicate like (but not necessarily identical) elements throughout the figures, example embodiments are described in detail.

FIG. 1 is a block diagram depicting a system 100 for determining the security of a wireless network connection, in accordance with certain example embodiments. As depicted in FIG. 1, the system 100 includes network computing devices 110 and 130 that are configured to communicate with one another via one or more networks 120. In some embodiments, a user associated with a device must install an application and/or make a feature selection to obtain the benefits of the techniques described herein.

For example, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages, and allows for the measurement of a received signal strength indicator ("RSSI") or other similar measurement such as the free space path loss, the received channel power indicator ("RCPI"), the time of arrival ("TOA"), and/or the round trip time ("RTT"). Throughout the discussion of example embodiments, it should be understood that the terms "data" and "information" are used interchangeably herein to refer to text, images, audio, video, or any other form of information that can exist in a computer-based environment.

Each network computing device 110 and 130 includes a device having a communication module capable of transmitting and receiving data over the network 120. For example, each network computing device 110 and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110 and 130 are operated by users 101 and merchant system operators, respectively.

An example user computing device 110 comprises a user interface 111, a data storage unit 112, an antenna 113, an application 114, a controller 115, a communication application 116, a web browser 117, and a payment application 118. In an example embodiment, the user interface 111 enables the user 101 to interact with the application 114, the web browser 117 and/or the payment application 118. For example, the user interface 111 may be a touch screen, a voice-based interface or any other interface that allows the user 101 to provide input and receive output from an application or module on the user computing device 110. In an example embodiment, the user 101 interacts via the user interface 111 with the application 114 to accept or deny a network 120 connection with a merchant beacon device 130 or with the payment application 118 or web browser 117 to initiate or confirm a transaction with a merchant system.

In an example embodiment, the data storage unit 112 comprises a local or remote data storage structure accessible to the user computing device 110 suitable for storing information. In an example embodiment, the data storage unit 112 stores encrypted information, such as HTML5 local storage. In an example embodiment, the data storage unit 112 stores RSSI data pairs comprising received reverse RSSI values from the merchant beacon device 130 and RSSI values of the merchant beacon device 130 subsequently determined by the user computing device 110. In this example embodiment, a reverse RSSI is the RSSI of the user computing device 110 as determined by the merchant beacon device 130. In an example embodiment, the data storage unit 112 is accessible by the application 114 and/or the payment application 118.

In an example embodiment, the application 114 is a program, function, routine, applet, or similar entity that exists on and performs its operations on the user computing device 110. In certain embodiments, the user 101 must install the application 114 and/or make a feature selection on the user computing device 110 to obtain the benefits of the techniques described herein. In an example embodiment, the user 101 may access the application 114 on the user computing device 110 via a user interface 111. In an example embodiment, the application 114 may transmit and receive probing requests via the controller 115 through the antenna 113 to determine if network 120 devices are available within proximity with which the user computing device 110 may establish network 120 connections. In an example embodiment, the application 114 receives a request from the merchant beacon device 130 to establish a network 120 connection between the user computing device 110 and merchant beacon device 130. In this example embodiment, the application 114 may request and may receive user 101 confirmation to establish the network 120 connection. In another example embodiment, the user 101 configures the settings of the application 114 and/or the user computing device 110 to allow the application 114 to automatically establish a network connection with the merchant beacon device 130. In an example embodiment, the application 114 communicates with the controller 115 to establish a network 120 connection with the merchant beacon device 130 via an radio frequency ("RF") antenna 113. In another example embodiment, the user computing device 110 transmits a request to the merchant beacon device 130 to establish a network 120 connection with the merchant beacon device 130.

In an example embodiment, the application 114 insures the security of the network 120 by periodically receiving reverse RSSI values from the merchant beacon device 130, subsequently determining the corresponding RSSI values of the merchant beacon device 130, saving each reverse RSSI and corresponding RSSI in an RSSI data pair, and determining whether a correspondence does exist in the change in RSSI values and reverse RSSI values in the two most recent RSSI data pairs. In another example embodiment, the application 114 receives an encoded digital signature from the merchant beacon device 130 via the network 120 connection. In this example embodiment, the application 114 decrypts the digital signature via a public key received from the merchant beacon device 130 and verifies the digital signature as belonging to a merchant system associated with the merchant beacon device 130. In an example embodiment, the application 114 may terminate a network 120 connection if the application 114 determines the network 120 connection to be insecure based on one or more criteria, for example, a determination that there is not a correspondence between the changes in the RSSI values and reverse RSSI values in the two most recent RSSI data pairs or a determination that a received digital signature is not decryptable via the public key or does not pertain to a merchant system associated with the merchant beacon device 130.

In certain example embodiments, one or more functions herein described as performed by the application 114 may also be performed by the payment application 118. In certain example embodiments, one or more functions herein described as performed by the application 114 may also be performed by the user computing device 110 operating system.

In an example embodiment, the controller 115 communicates with the application 114 (and/or payment application 118) and is capable of sending and receiving data over the network 120. In an example embodiment, the controller 115 activates the RF antenna 113 to create the network 120. In an example embodiment, the controller 115 is a Bluetooth low energy link controller, a Bluetooth link controller, a Wi-Fi controller, or any other wireless network 120 controller suitable to perform the methods described herein. In an example embodiment, the controller 115 polls through the antenna 113 a radio signal, or listens for radio signals from the merchant beacon device 130.

In an example embodiment, the user 101 can use a communication application 116, such as a web browser 117 application or a stand-alone application 114, to view, download, upload, or otherwise access documents or web pages via a distributed network 120.

In an example embodiment, the communication application 116 can interact with web servers or other computing devices connected to the network 120, including the user computing device 110 and a web server of a merchant system associated with the merchant beacon device 130.

In an example embodiment, the web browser 117 can enable the user 101 to interact with web pages using the user computing device 110. In an example embodiment, the user 101 initiates a transaction with the merchant system associated with the merchant beacon device 130 via a payment application on the web browser 117. In another example embodiment, the user 101 receives a request for a transaction from the merchant system via the web browser 117. In this example embodiment, the user 101 may select to allow or deny the transaction by selecting an object in the web browser 117 via the user interface 111.

In an example embodiment, the payment application 118 is a program, function, routine, applet, or similar entity that exists on and performs its operations on the user computing device 110. In certain embodiments, the user 101 must install the payment application 118 and/or make a feature selection on the user computing device 110 to obtain the benefits of the techniques described herein. In an example embodiment, the user 101 may access the payment application 118 on the user computing device 110 via a user interface 111. In an example embodiment, the user 101 may initiate transactions with the merchant system via the payment application 118 and/or may receive requests to initiate transactions from the merchant system via the network 120. In certain example embodiments, one or more functions herein described as performed by the application 114 may be performed by the payment application 118.

In an example embodiment, the user computing device 110 communicates with the merchant beacon device 130 via the antenna 113 over the network 120. In an example embodiment, the antenna 113 is a radio frequency ("RF") antenna.

An example merchant beacon device 130 comprises an application 131, a data storage unit 132, a controller 133, an antenna 135, an accelerometer 137, and a secure element 139. In an example embodiment, the merchant beacon device 130 is associated with a merchant system. In this example embodiment, the merchant system (not shown) configures the merchant beacon device 130 and places the merchant beacon device 130 at a physical location associated with the merchant system. For example, the merchant system may place the merchant beacon device 130 near or within a point of sale ("POS") terminal associated with the merchant system at a merchant system location. In this example, a user computing device 110 may allow a financial transaction with the merchant system when it establishes a network 120 connection with the merchant beacon device 130 and determines that the connection is secure.

In another example embodiment, the merchant beacon device 130 is not associated with a merchant system. For example, the merchant beacon device 130 may be associated with a security system or for personal use by a user associated with the user computing device 110. In this example embodiment, the appropriate system or user configures the merchant beacon device 130 and places the merchant beacon device 130 in a physical location in accordance with the purpose of the merchant beacon device 130. For example, the merchant beacon device 130 may be placed near a door so that when the user computing device 110 determines it has a secure network connection, the door is unlocked.

In an example embodiment, the application 131 is a program, function, routine, applet, or similar entity that exists on and performs its operations on the merchant beacon device 130. In certain embodiments, a merchant system operator associated with the merchant beacon device 130 must install the application 131 and/or make a feature selection on the merchant beacon device 130 to obtain the benefits of the techniques described herein. In an example embodiment, the merchant system operator may access the application 131 on the merchant beacon device 130 via a user interface (not depicted). In an example embodiment, the application 131 communicates with the secure element 139. In an example embodiment, the application 131 is resident on the merchant beacon device 130 within the secure element 139. In an example embodiment, the application 131 may transmit and receive probing requests via the controller 133 through the antenna 135 to determine if there are user computing devices 110 within proximity with which the merchant beacon device 130 may establish network 120 connections. In an example embodiment, the application 131 may receive a request to establish a network 120 connection from the user computing device 110. In this example embodiment, the application 131 may establish the network 120 connection in response to receiving the request to establish the network 120 connection. In another example embodiment, the application 131 may transmit a request to establish a network 120 connection to the user computing device 110.

In an example embodiment, the application 131 communicates with the accelerometer 137 to determine if the merchant beacon device 130 has been moved. In this example embodiment, the application 131 may terminate the network connection if it determines that the merchant beacon device 130 has been moved.

In an example embodiment, the application 131 may periodically determine the reverse received signal strength indicator ("reverse RSSI") of the user computing device 120 with which the merchant beacon device 130 has established a network 120 connection. In an example embodiment, the application 131 communicates with the data storage unit 132 to store one or more reverse RSSI values. In an example embodiment, the application 131 transmits data comprising a reverse RSSI to the user computing device 110 via the network 120. In this example embodiment, the application 131 may periodically transmit data comprising a subsequent reverse RSSI to the user computing device 110. In this example embodiment, the data comprising the reverse RSSI or data comprising any subsequent reverse RSSI may further comprise advertising data and a digital signature. In an example embodiment, the application 131 communicates with the secure element 139, which comprises a private key, to create a digital signature to send in the data comprising the reverse RSSI.

In an example embodiment, the data storage unit 132 comprises a local or remote data storage structure accessible to the merchant beacon device 130 suitable for storing information. In an example embodiment, the data storage unit 132 stores encrypted information, such as HTML5 local storage. In an example embodiment, the data storage unit 132 stores one or more reverse RSSI values determined by the merchant beacon device 130. For example, the reverse RSSI is the RSSI of the user computing device 110 as determined by the merchant beacon device 130.

In an example embodiment, the controller 133 communicates with the application 131 and is capable of sending and receiving data over the network 120. In an example embodiment, the controller 133 activates the antenna 135 to create the network 120. In an example embodiment, the controller 133 is a Bluetooth low energy link controller, a Bluetooth link controller, a Wi-Fi controller, or any other wireless network 120 controller suitable to perform the methods described herein. In an example embodiment, the controller 133 polls through the antenna 135 a radio signal, or listens for radio signals from the user computing device 110.

In an example embodiment, the accelerometer 137 is capable of detecting any movement of the merchant beacon device 130. In an example embodiment, the accelerometer 137 detects physical movement of the merchant beacon device 130 and communicates with the application 131.

In an example embodiment, the secure element 139 comprises a private key used to create digital signatures sent in the data comprising the reverse RSSI. In an example embodiment, the application 131 is resident on the secure element 139.

In an example embodiment, the merchant beacon device 130 communicates with the user computing device 110 via the antenna 135. In an example embodiment, the antenna 135 is a radio frequency ("RF") antenna.

It will be appreciated that the network connections shown are example and other means of establishing a communications link between the computers and devices can be used. Moreover, those having ordinary skill in the art having the benefit of the present disclosure will appreciate that the user computing device 110 and the merchant beacon device 130 illustrated in FIG. 1 can have any of several other suitable computer system configurations. For example, a user computing device 110 embodied as a mobile phone or handheld computer may or may not include all the components described above.

Figure 6:
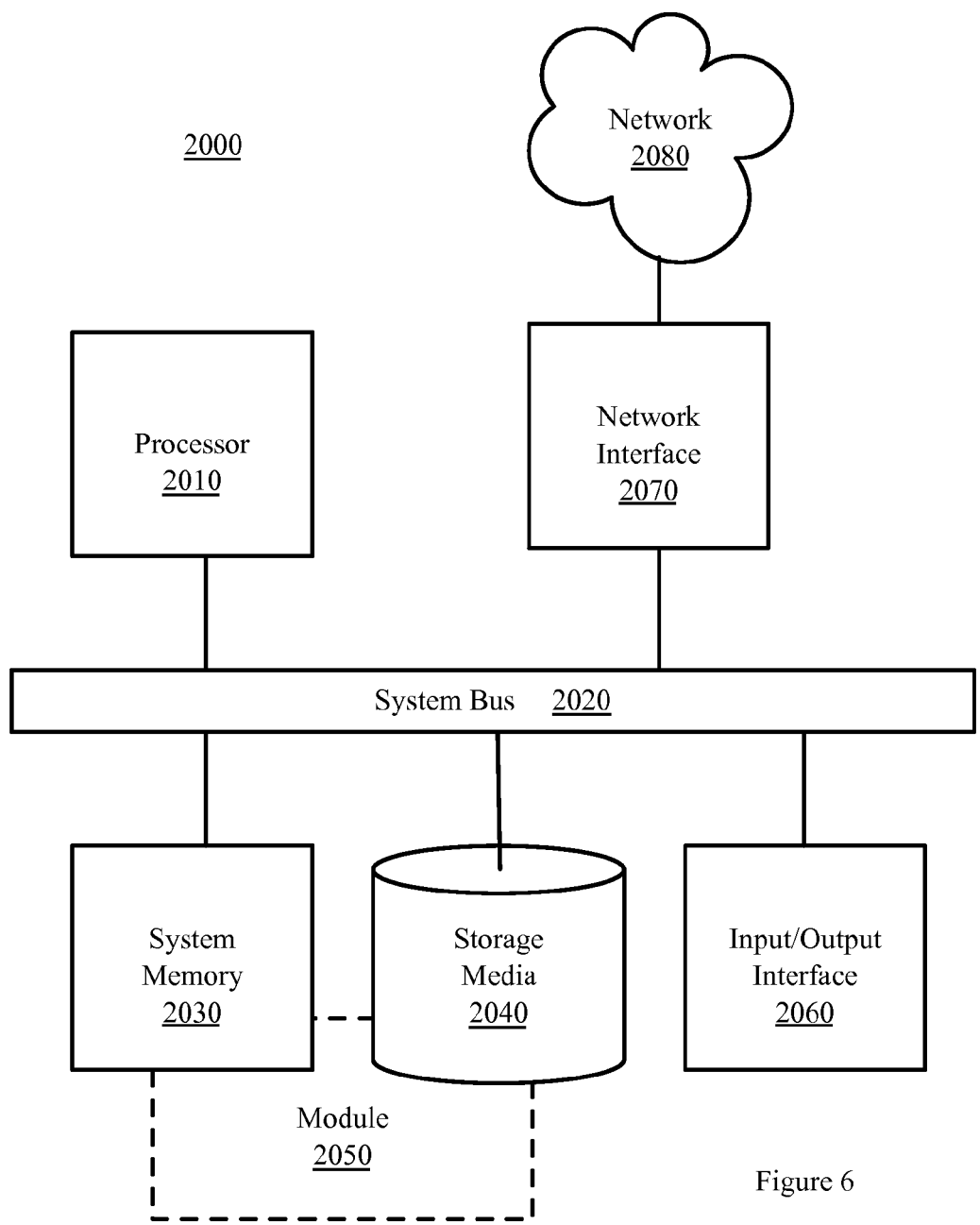
FIG. 6 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 6. Furthermore, any modules associated with any of these computing machines, such as modules described herein or any other modules (scripts, web content, software, firmware, or hardware) associated with the technology presented herein may by any of the modules discussed in more detail with respect to FIG. 6. The computing machines discussed herein may communicate with one another as well as other computer machines or communication systems over one or more networks, such as network 120. The network 120 may include any type of data or communications network, including any of the network technology discussed with respect to FIG. 6.

Example Processes

The example methods illustrated in FIGS. 2-5 are described hereinafter with respect to the components of the example operating environment 100. The example methods of FIGS. 2-5 may also be performed with other systems and in other environments.

Figure 2:
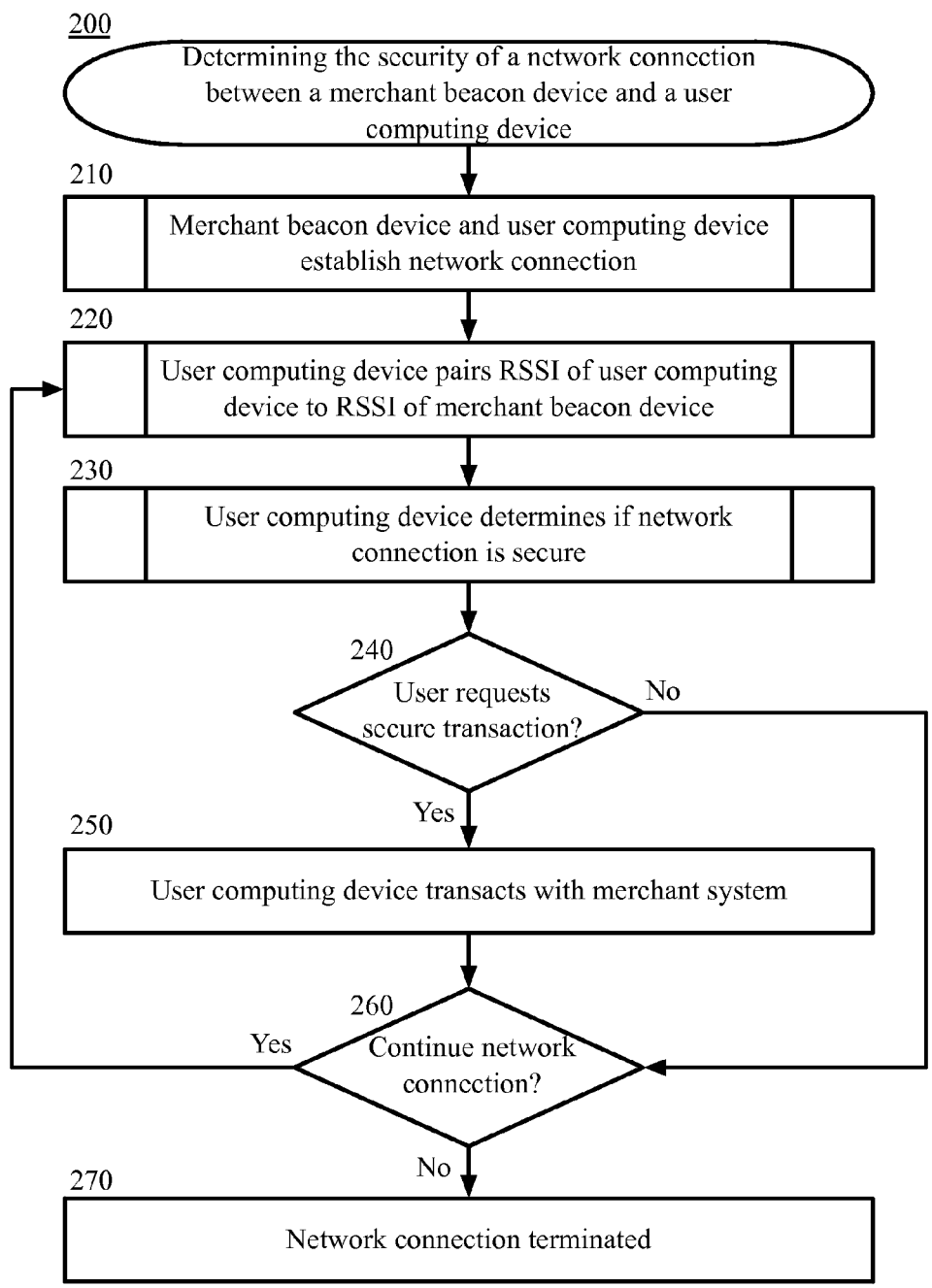
FIG. 2 is a block flow diagram depicting a method for determining the security of a wireless network connection between a merchant beacon device and a user computing device, in accordance with certain example embodiments.

FIG. 2 is a block diagram depicting a method 200 for determining the security of a network 120 connection between a merchant beacon device 130 and a user computing device 110, in accordance with certain example embodiments. The method 200 is described with reference to the components illustrated in FIG. 1.

In block 210, the merchant beacon device 130 and the user computing device 110 establish a network 120 connection. The method for establishing a network 120 connection is described in more detail hereinafter with reference to the method described in FIG. 3.

Figure 3:
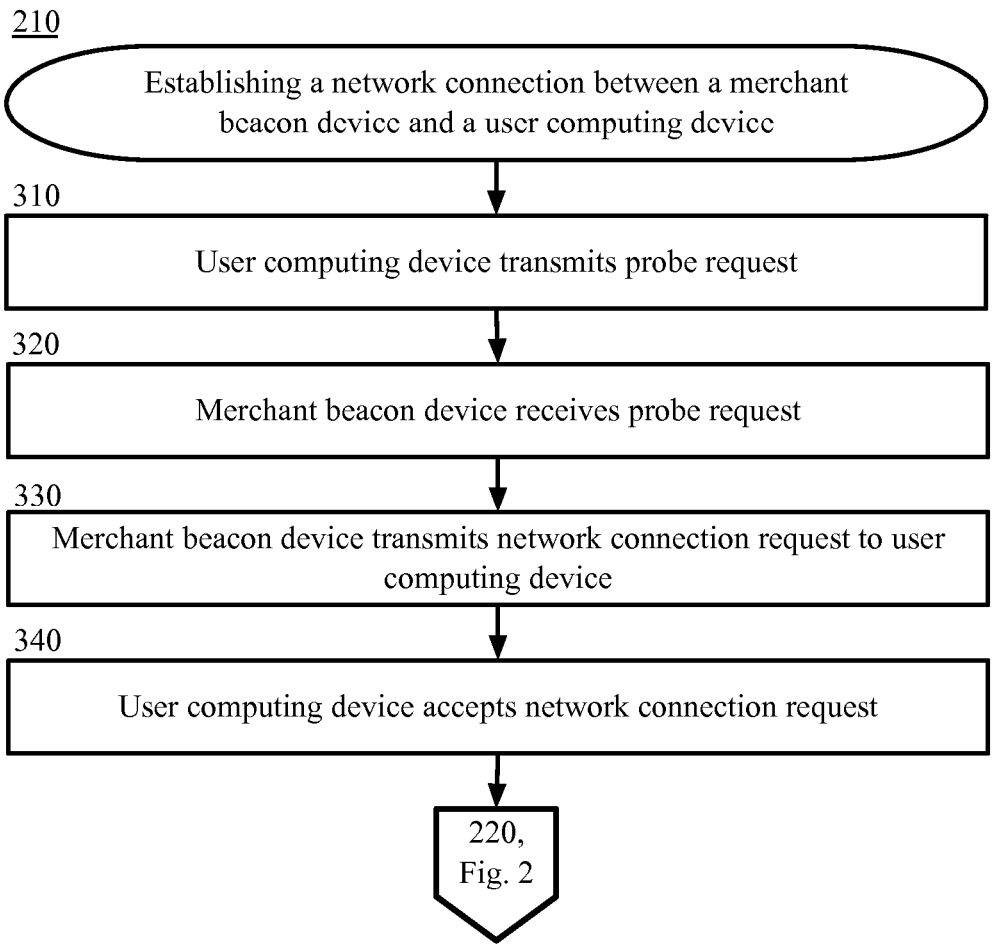
FIG. 3 is a block flow diagram depicting a method for establishing a network connection between a merchant beacon device and a user computing device, in accordance with certain example embodiments.

FIG. 3 is a block diagram depicting a method 210 for establishing a network 120 connection between a merchant beacon device 130 and a user computing device 110, in accordance with certain example embodiments. The method 210 is described with reference to the components illustrated in FIG. 1.

In certain example embodiments described herein, a merchant beacon device 130 is located at a physical location associated with a merchant system. For example, the merchant system may be a restaurant chain and the merchant beacon device 130 is located at a restaurant location associated with the restaurant chain. In certain example embodiments, a user computing device 110 associated with a user 101 is located within a predefined proximity of the merchant beacon device 130 to enable a network 120 connection to be established between the two network 120 devices. In an example embodiment, the user 101 brings a user computing device 110 to a merchant system location wherein a merchant beacon device 130 is located. For example, a user 101 carries his mobile phone network 120 device into a supermarket. In this example, the supermarket has installed a merchant beacon device 130 at the supermarket location.

In block 310, the user computing device 110 transmits a probe request. In certain example embodiments, an RF field or other field is activated on the user computing device 110 to poll for the presence of network devices. In an example embodiment, the user computing device 110 transmits probe requests in an attempt to locate wireless network devices with which to establish a network 120 connection. The user 101 may configure the settings of the user computing device 110 to receive probe requests and to periodically transmit probe requests to locate network 120 devices with which to establish a network 120 connection. An example probe request may comprise a user computing device 110 identifier, for example, a hardware identification or media access control ("MAC") address identifying the user computing device 110. In an example embodiment, network 120 communications originating from the user computing device 110 comprise the user computing device 110 identifier to enable the merchant beacon device 130 to identify the user computing device 110 as the source of the communication.

In block 320, the merchant beacon device 130 receives the probe request. In an example embodiment, the merchant beacon device 130 identifies the user computing device 110 via the received user computing device 110 identifier. In an example embodiment, network 120 communications originating from the user computing device 110 comprise the user computing device 110 identifier to enable the merchant beacon device 130 to identify the user computing device 110 as the source of the communication. In an example embodiment, a merchant system operator may configure the settings of the merchant beacon device 130 to receive probe requests and to periodically transmit probe requests to locate network 120 devices with which to establish a network 120 connection.

In block 330, the merchant beacon device 130 transmits a network 120 connection request to the user computing device 110. The network 120 connection request may comprise a merchant beacon device 130 identifier. For example, the identifier identifies a merchant system associated with the merchant beacon device 110. In an example embodiment, the user 101 is notified of the network 120 connection request and given the option to select, via the user interface 111, whether to accept or not to accept the network 120 connection request from the merchant beacon device 130. In this example embodiment, the user interface 111 may display the merchant beacon device 130 identifier. For example, the user computing device receives a network 120 connection request from a merchant beacon device 130 comprising an identifier, such as "Merchant A." In this example, the user interface 111 displays a screen that reads, "would you like to access Merchant A's network?" and two user interface 111 objects comprising a "yes" option and a "no" option. The user may select the appropriate option.

In block 340, the user computing device 110 accepts the network 120 connection request. In an example embodiment, the user 101 actuates a user interface 111 object to accept or deny the network 120 connection request. In an example embodiment, a wireless network 120 communication channel is established when the user computing device accepts the network 120 connection request. In another example embodiment, the user computing device 110 receives a public cryptographic key from the merchant beacon device 130. In this example embodiment, the user computing device 110 comprises a private cryptographic key, which combined with the public cryptographic key, enables the user computing device 110 to decrypt a digital signature received from the merchant beacon device 130. In another example embodiment, the merchant beacon device 130 receives a public cryptographic key from the user computing device 110 and the merchant beacon device 130 comprises the private cryptographic key.

In another example embodiment, the merchant beacon device 130 transmits a probe response, the user computing device 110 receives the probe response, the user computing device 110 transmits a network 120 connection request to the merchant beacon device 130. In this example embodiment, the user computing device 110 may transmit the network 120 connection request in response to a user 101 selecting, via the user interface 111, an option to attempt a network 120 connection with the merchant beacon device 130. In this example, the user computing device may display a list of one or more wireless network 120 devices, including the merchant beacon device 130, for which the user computing device 110 has received a probe request and identifier and provide the user 101 the opportunity to select a network 120 device with which to establish a network 120 connection via the user computing device 110. In this example, the user 101 actuates a user interface 111 object to select the merchant beacon device 130 and the user computing device 110 transmits a network 120 connection request to the merchant beacon device 130. In this example, the merchant beacon device 130 accepts the network 120 connection request and the network 120 connection is established between the user computing device 110 and the merchant beacon device 130.

From block 340, the method 210 proceeds to block 220 of FIG. 2.

Returning to FIG. 2, in block 220, the user computing device 110 pairs an RSSI of the user computing device 110 to an RSSI of the merchant beacon device 130. The method for pairing the RSSI of the user computing device 110 and the merchant beacon device 130 is described in more detail hereinafter with reference to the method described in FIG. 4.

Figure 4:
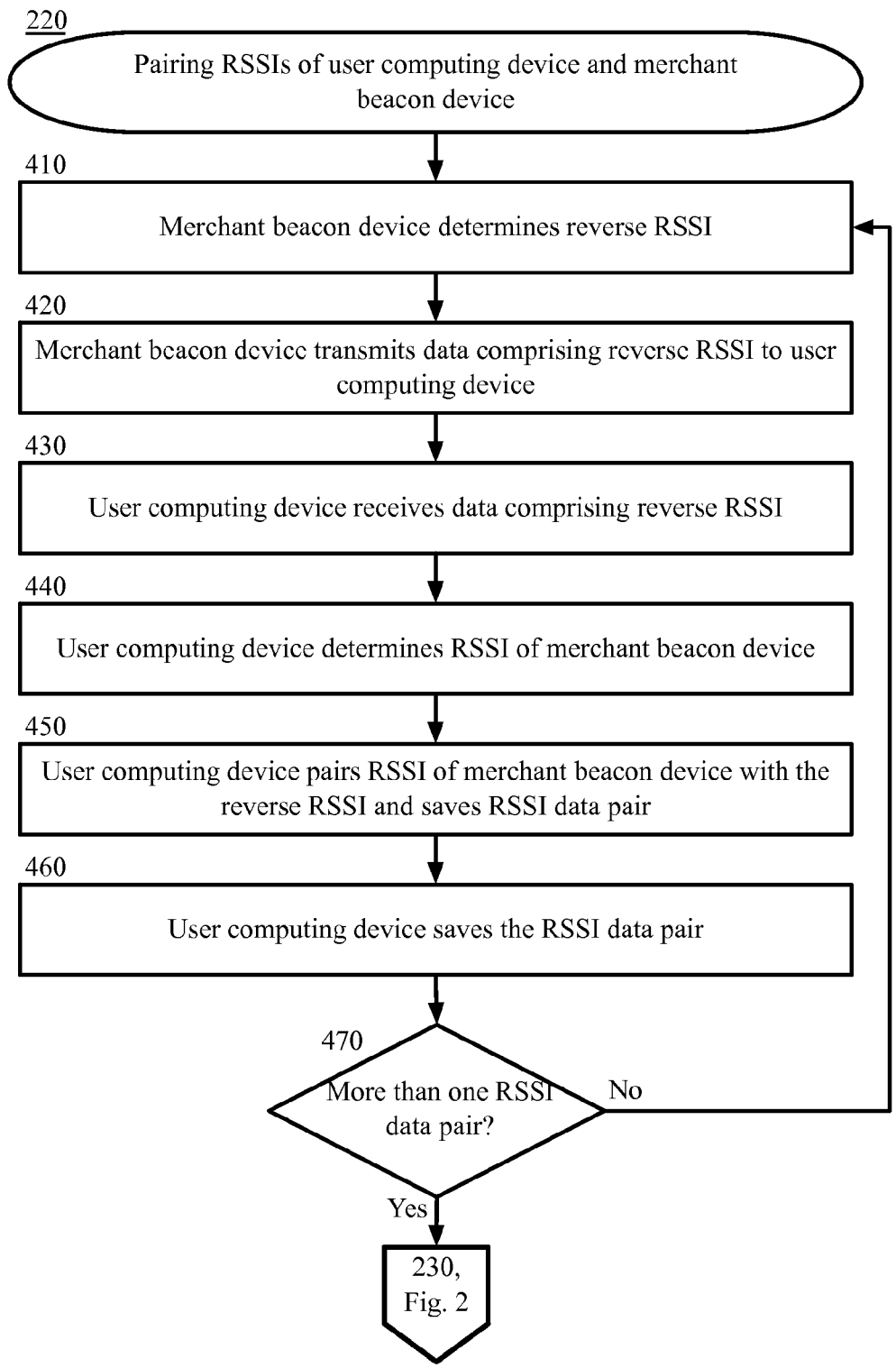
FIG. 4 is a block flow diagram depicting a method for pairing the RSSI of a user computing device and a merchant beacon device, in accordance with certain example embodiments.

FIG. 4 is a block diagram depicting a method 220 for pairing the RSSI of the user computing device 110 and the merchant beacon device 130.

In block 410, the merchant beacon device 130 determines the reverse RSSI. The RSSI indicates the relative strength of a radio signal received by a network 120 device. The RSSI or other estimate of distance may be an integer number on a logarithmic scale, such as a decibel ("dB") scale. The RSSI may be used as a proxy to estimate the distance between two network 120 devices. For example, as a first network 120 device is moved away from a second network 120 device, the RSSI of the second network 120 device, as determined by the first network 120 device, decreases. Likewise, the RSSI of the first network 120 device as determined by the second network 120 device also decreases when the devices become farther apart from each other. In another example, as the first network 120 device is moved closer to a second network 120 device, the RSSI of the second network 120 device as determined by the first network 120 device increases. Likewise, the RSSI of the first network 120 device as determined by the second network 120 device also increases when the devices are brought nearer one another. In another example embodiment, another proxy to estimate the distance between two network 120 devices is utilized, for example, the free space path loss, the received channel power indicator ("RCPI"), the time of arrival ("TOA"), or any other appropriate measure to estimate the distance between the network 120 devices. In these examples, measurements of the proxy substitute for the measurement of RSSI values.

In an example embodiment, the reverse RSSI is the RSSI of the user computing device 110 as determined by the merchant beacon device 130. The reverse RSSI is referred to as "reverse" because, though the reverse RSSI is determined from the perspective of the merchant beacon device 130, the reverse RSSI is later evaluated from the perspective of the user computing device 110. In an example embodiment, the controller 133 communicates with an application 131 and/or a data storage unit 132. In an example embodiment, the merchant beacon device 130 receives the radio signal of the user computing device 110 via the antenna 135 and determines the reverse RSSI using the controller 133 or the application 131. In an example embodiment, the reverse RSSI or other proxy measurement of distance is stored in the data storage unit 132.

In block 420, the merchant beacon device 130 transmits data comprising the reverse RSSI to the user computing device 110. In an example embodiment, after the merchant beacon device 130 establishes a network 120 connection with the user computing device 110, the merchant beacon device 130 periodically transmits data comprising the reverse RSSI to the user computing device 110. In an example embodiment, the application 131 retrieves the saved reverse RSSI from the data storage unit 132 and transmits data comprising the reverse RSSI to the user computing device 110 via the network 120. In an example embodiment, the transmitted data further comprises the merchant beacon device 130 identifier. In another example embodiment, the transmitted data further comprises the time at which the reverse RSSI was determined. In an example embodiment, the data comprising the reverse RSSI is sent within a predetermined time limit from when the merchant beacon device 130 determines the RSSI. For example, the data comprising the reverse RSSI must be sent shortly after it is determined so that the user computing device 110 may receive the reverse RSSI and determine an RSSI shortly thereafter. In this example, it is important that the RSSI be determined shortly after the reverse RSSI so that the two measurements can be paired and approximated as pertaining to the same moment in time. In an example embodiment, the merchant beacon device 130 periodically transmits advertising data packets to the user computing device 110. In this example embodiment, the merchant beacon device 130 determines the reverse RSSI and transmits an advertising data packet comprising the reverse RSSI in response to determining the reverse RSSI.

In block 430, the user computing device 110 receives the data comprising the reverse RSSI. In an example embodiment, the user computing device 110 application 114 extracts the reverse RSSI from the received data. In this example embodiment, the application 114 may extract the reverse RSSI from the received data the time at which the reverse RSSI was determined by the merchant beacon device 130. In an example embodiment, the application 114 saves the reverse RSSI and the time of determination and/or receipt of the reverse RSSI by the user computing device 110. For example, the user computing device 110 saves the reverse RSSI on the data storage unit 112 along with the time the reverse RSSI was determined and/or the time the data comprising the reverse RSSI was received by the user computing device 110.

In block 440, the user computing device 110 determines the RSSI of the merchant beacon device 130. In an example embodiment, the user computing device 110 determines the RSSI of the merchant beacon device 130 in response to receiving the data comprising the reverse RSSI. In an example embodiment, the user computing device 110 determines the RSSI of the merchant beacon device 130 within a predetermined time from receiving the reverse RSSI. For example, the RSSI should be determined at the same time or shortly after the reverse RSSI is determined so that the two measurements can be paired and approximated as pertaining to the same moment in time. In another example embodiment, another proxy to estimate the distance between two network devices is utilized, for example, the free space path loss, the received channel power indicator ("RCPI"), the time of arrival ("TOA"), round trip time ("RTT"), and/or any other appropriate measure to estimate the distance between the devices. In these examples, measurements of the proxy substitute for the measurement of RSSI values. In an example embodiment, the user computing device 110 saves the RSSI of the merchant device and the time at which the user computing device 110 determined the RSSI.

In block 450, the user computing device 110 pairs the RSSI of the merchant beacon device 130 with the reverse RSSI. In an example embodiment, the user computing device application 114 extracts the saved RSSI, the corresponding saved reverse RSSI and any associated saved data, such as, the times at which the reverse RSSI and RSSI were determined. In an example embodiment, the user computing device 110 application 114 determines that a saved RSSI is associated with a saved reverse RSSI according to data identifying the time at which the RSSI and reverse RSSI were determined by the respective network 120 devices.

In block 460, the user computing device 110 saves the RSSI data pair. In an example embodiment, the user computing device application 114 saves the RSSI data pair in the data storage unit 112. In an example embodiment, if the time at which the merchant beacon device 130 determined the reverse RSSI is different from the time at which the user computing device 110 determined the RSSI, the user computing device 110 averages or approximates the two time data to create an effective time data. The effective time data comprises the time at which the RSSI and reverse RSSI are considered to have been effectively determined by the appropriate network 120 devices. An example RSSI data pair therefore comprises the reverse RSSI, the RSSI, and the effective time data.

In block 470, the user computing device 110 determines whether more than one RSSI data pair is saved on the user computing device 110. In an example embodiment, in response to saving an RSSI data pair, the user computing device application 114 communicates with the data storage unit 112 to determine whether more than one saved RSSI data pair are stored. In another example embodiment, the application 114 determines whether more than one saved RSSI data pair are within a predefined range of time. For example, the predefined range of time may be five seconds, ten seconds, or any appropriate predefined range of time.

If the user computing device 110 determines that not more than one saved RSSI data pair is stored, the method 220 proceeds to block 410. For example, the user computing device application 114 communicates with the data storage unit 112 and determines that there is only one RSSI data pair saved on the data storage unit 112. In another example embodiment, the application 114 determines that two or more RSSI data pairs are stored, however, the two most recent RSSI data pairs are not within a predefined range of time. For example, the application 114 determines that the data storage unit 112 comprises RSSI data pairs corresponding to times 07:15:25, 07:15:23, and 07:15:20 (of the current date and time zone), wherein the time associated with each of the RSSI data pairs is the time that the reverse RSSI and corresponding RSSI values were effectively determined for the data pair. In this example, the two most recent RSSI data pairs correspond to times 07:15:25 and 07:15:23. If the predefined range of time is one second, for example, the times associated with the two most recent RSSI data pairs are not within the predefined range.

In these example embodiments where the user computing device 110 determines that not more than one saved RSSI data pair is stored or that the two most recent saved RSSI data pairs are not within a predefined range of time, the method 220 repeats. For example, the merchant beacon device 130 determines a subsequent reverse RSSI and transmits data comprising the subsequent reverse RSSI to the user computing device 110. In this example, the user computing device 110 receives the subsequent reverse RSSI from the merchant beacon device 130, determines a subsequent RSSI of the user computing device 110, pairs the subsequent reverse RSSI with the subsequent RSSI, and saves a subsequent RSSI data pair.

Returning to block 470, if the user computing device 110 determines that more than one saved RSSI data pair is stored on the user computing device 110, the method 220 proceeds to block 230 of FIG. 2. For example, the application 114 determines that the data storage unit 112 comprises RSSI data pairs corresponding to times 07:15:25, 07:15:23, and 07:15:20 (of the current date and time zone), wherein the time associated with each of the RSSI data pairs is the time that the reverse RSSI and corresponding RSSI values were effectively determined for the data pair. In an example, the application 114 determines that there are two or more saved RSSI data pairs and proceeds to compare the RSSI data pairs to determine if a correspondence does exist. In another example, the application 114 determines that there are two or more saved RSSI data pairs, extracts the two most recent RSSI data pairs, and determines whether the two most recent RSSI data pairs are within a predefined time range of each other. In this example, the two most recent RSSI data pairs correspond to times 07:15:25 and 07:15:23. If the predefined range of time is five seconds, for example, the application 114 then proceeds to compare the RSSI data pairs to determine if is a correspondence exists.

Returning to FIG. 2, in block 230, the user computing device 110 determines if the network 120 connection is secure. The method for determining that a network 120 connection is secure based on the correspondence of RSSI data pairs is described in more detail hereinafter with reference to the method 230 described in FIG. 5.

Figure 5:
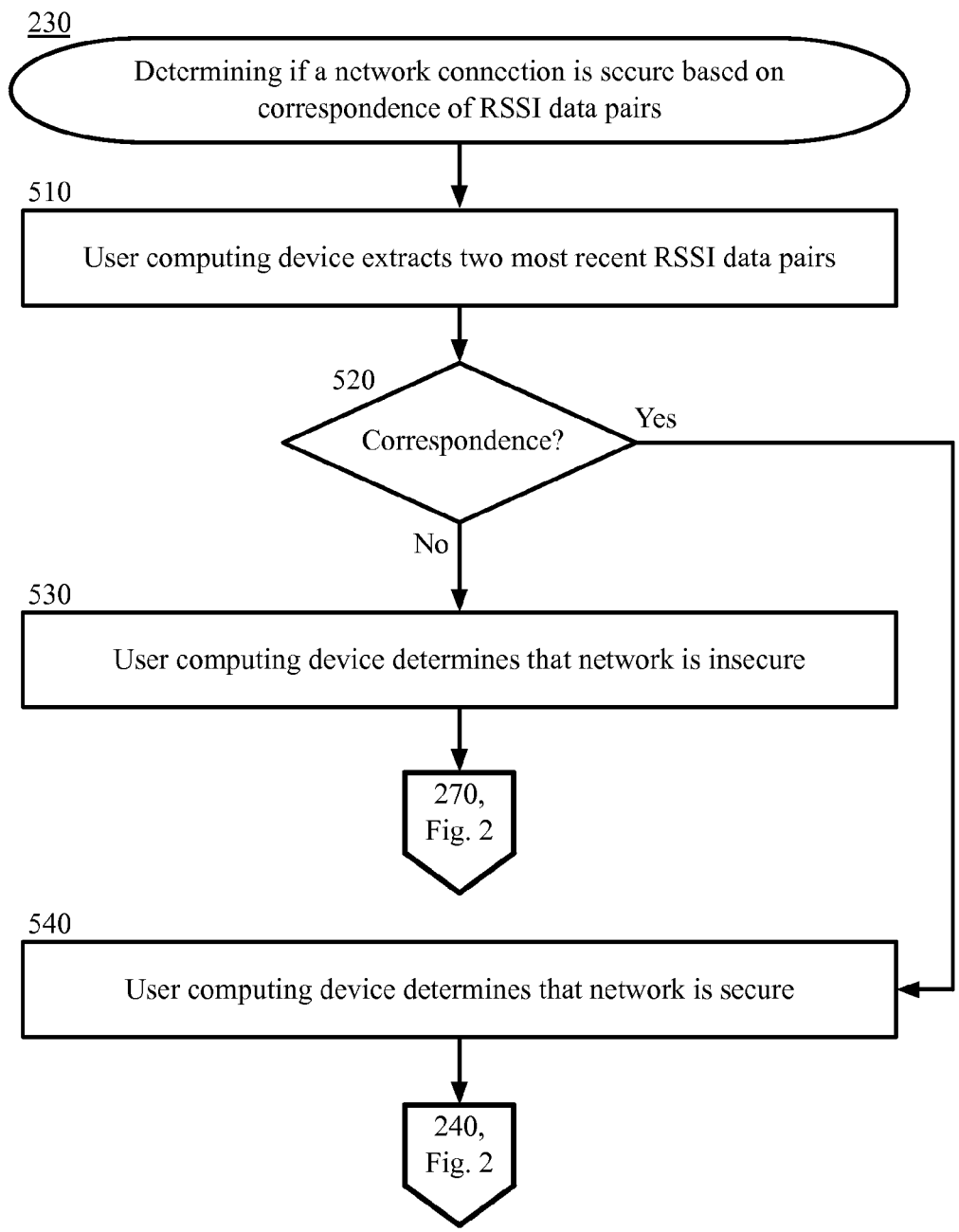
FIG. 5 is a block flow diagram depicting a method for determining that a network connection is secure based on correspondence of RSSI data pairs, in accordance with certain example embodiments.

FIG. 5 is a block diagram depicting a method 230 for determining if a network 120 connection is secure based on a correspondence of RSSI data pairs.

In block 510, the user computing device 110 extracts the two most recent RSSI data pairs. In an example embodiment, the application 114 extracts the two most recent RSSI data pairs from the data storage unit 112. In an example, each RSSI data pair comprises a reverse RSSI, an RSSI, and an effective time data. In this example, the two most recent RSSI data pairs have the two most recent effective time data with respect to the current time as determined by the application 114. As previously discussed, the effective time data comprises the time at which the RSSI and the corresponding reverse RSSI are considered to have been effectively determined.

In block 520, the user computing device 110 determines whether a correspondence does exist in the two most recent RSSI data pairs.

As previously discussed, an RSSI may be used as a proxy to estimate the distance between two network 120 devices. For example, as a first network 120 device is moved away from a second network 120 device, the RSSI of the second network 120 device as determined by the first network 120 device decreases. Likewise, the RSSI of the first network 120 device as determined by the second network 120 device also should decrease when the network 120 devices become farther apart from each other. In another example, as the first network 120 device is moved closer to the second network 120 device, the RSSI of the second network 120 device as determined by the first network 120 device increases. Likewise, the RSSI of the first network 120 device as determined by the second network 120 device also should increase when the network 120 devices become closer together to each other.

In an example embodiment, the two most recent RSSI data pairs comprise a first RSSI data pair and a subsequent RSSI data pair. The first RSSI data pair comprises an effective time data prior to the effective time data of the subsequent RSSI data pair. In this example embodiment, the first RSSI data pair comprises a reverse RSSI ("first reverse RSSI") and a corresponding RSSI ("first RSSI"). Likewise, the subsequent RSSI data pair comprises a reverse RSSI ("subsequent reverse RSSI") and a corresponding RSSI ("subsequent RSSI").

In an example embodiment, any change in the RSSI values and reverse RSSI values over time between the two network 120 devices should be proportional to establish a correspondence between the RSSI data pairs. For example, if a twofold increase occurs between the first RSSI and the subsequent RSSI, correspondence does not exist between the RSSI data pairs if a threefold increase, a decrease, or no change occurs between the first reverse RSSI and the subsequent reverse RSSI. In this example, a correspondence in the RSSI data pairs would result if approximately a twofold increase occurred between the first reverse RSSI and the subsequent reverse RSSI to correspond to the twofold increase between the first RSSI and the subsequent RSSI. In certain example embodiments, a non-proportional change in the RSSI values and reverse RSSI values may indicate that the merchant beacon device 130 has been moved or that the reverse RSSI data has been retransmitted by a third network 120 device as the reverse RSSI data is communicated between the merchant beacon device 130 and the user computing device 110.

If the user computing device determines that a correspondence does not exist in the two most recent RSSI data pairs, the method 230 proceeds to block 530.

For example, an undesired third party network 120 device retransmits data sent from the merchant beacon device 130 to the user computing device 110. In this example, the merchant beacon device 130 is moved from its location and replaced with the third party network 120 device, which retransmits data sent from the merchant device 130 to the user computing device 110. In this example, as the user computing device 110 moves, it will detect a change in the RSSI of the third party network 120 device. However, the reverse RSSI will not change over time because the third party network 120 device is stationary. For example, the merchant beacon device 130 would detect the reverse RSSI as the RSSI of the third party network 120 device and transmit data comprising this reverse RSSI via the third party network 120 device to the user computing device 110. Because the RSSI would change over time as the user computing device 110 moves and the corresponding reverse RSSI would not change over time, the user computing device application 114 would determine that a correspondence in the two most recent RSSI data pairs does not exist because the changes in the RSSI values and reverse RSSI values are not proportional.

In another example, the merchant beacon device 130 is relocated and a moving, undesired third party network 120 device retransmits data sent from the stationary merchant beacon device 130 to a moving user computing device 110. In this example, the merchant beacon device 130 determines the RSSI of the moving third party network 120 device (the "reverse RSSI" in this example) over time and transmits data comprising the reverse RSSI via the third party network 120 device to the user computing device 110. The moving user computing device 110 determines the RSSI of the moving third party network 120 device over time. In this example embodiment, proportional changes in the RSSI values and reverse RSSI values of the two most recent RSSI data pairs are unlikely. To be proportional, the motion of the user computing device 110 and third party network 120 device is synchronized such that the distance between the merchant beacon device 130 and the third party network 120 device is equal to the distance between the third party network 120 device and the user computing device 110. Therefore, in this example, the user computing device application 114 not finding a correspondence in the changes in the RSSI values and reverse RSSI values of the two most recent RSSI data pairs is likely because the changes in the RSSI values and reverse RSSI values would not be proportional over time.

In block 530, the user computing device 110 determines that the network 120 is insecure. In an example embodiment, if correspondence does not exist in the changes in the RSSI values and reverse RSSI values of the two most recent RSSI data pairs, the user computing device application 114 determines that the network 120 is insecure.

In another example embodiment, the merchant beacon device 130 determines that the network connection is insecure based on detection of movement of the merchant beacon device 130. In this example embodiment, the merchant beacon device 130 comprises an accelerometer 137 that can detect if the merchant beacon device 130 has been moved. A merchant beacon device 130 may be moved for fraudulent purposes. For example, a user computing device 110 may only transact with a merchant system if the user computing device 110 is in proximity to a merchant beacon device 130 associated with the merchant system. In this example, the merchant beacon device 130 located near a point of sale ("POS") terminal associated with the merchant system is moved closer to a user computing device 110 to attempt to cause the user computing device 110 to allow a financial transaction with a fraudulent entity. In this example embodiment, the accelerometer 137 on the merchant beacon device 130 detects that the merchant beacon device 130 has moved.

In yet another example embodiment, the user computing device 110 determines that the network is insecure based on receipt of an invalid digital signature. In certain example embodiments, the data comprising the reverse RSSI sent by the merchant beacon device 130 to the user computing device 110 further comprises a digital signature created by the merchant beacon device 130 via a private cryptographic key. For example, the digital signature identifies the merchant beacon device 130 as being associated with a merchant system trusted by the user computing device 110. In this example embodiment, the user computing device 110 further verifies the validity of the merchant beacon device 130 by decrypting the digital signature using a public cryptographic key to verify that the merchant beacon device 130 is associated with the merchant system. In an example embodiment, the merchant beacon device 130 transmits the public cryptographic key in the data comprising the reverse RSSI to the user computing device 110.

From block 530, the method 230 then proceeds to block 270 in FIG. 2. Returning to FIG. 2, in block 270, the network 120 connection is terminated. In an example embodiment, if correspondence does not exist in the changes in the RSSI values and reverse RSSI values of the two most recent RSSI data pairs, the user computing device application 114 determines that the network 120 is insecure. In this example embodiment, the application 114 terminates the network 120 connection. In another example embodiment, after detecting movement via the accelerometer 137, the merchant beacon device 130 may terminate the network 120 connection or transmit an alert to the user computing device 110, wherein the user computing device 110 terminates the network 120 connection. In yet another example embodiment, the user computing device 110 can terminate the network connection with the merchant beacon device 130 based on a determination that the digital signature does not pertain to a merchant system with which the user intends to transact. In another example embodiment, the user computing device 110 leaves a predefined proximity of the merchant beacon device 130 necessary to maintain a network 120 connection, causing the network 120 connection to terminate. In another example embodiment, instead of terminating a network 120 connection based on a determination that the network 120 connection is insecure, the user computing device 110 notifies the user associated with the user computing device that the network 120 connection is insecure, notifies the merchant system that the network 120 connection is insecure, or performs any other suitable action.

Returning to block 520, in FIG. 5, if the user computing device 110 determines that a correspondence does exist in the two most recent RSSI data pairs, the method 230 proceeds to block 540. In an example, the user 101 intends to transact with the merchant system associated with the merchant beacon device 130 and the user 101 carries the user computing device 110 to a merchant POS terminal near the merchant beacon device 130. In this example, the user computing device 110 receives a reverse RSSI detected by the merchant beacon device 130 from the merchant beacon device 130. In this example, the user computing device 110 determines the RSSI of the merchant beacon device 130 and saves the RSSI data pair. In this example, the user computing device 110 receives a subsequent reverse RSSI from the merchant beacon device 130, determines a subsequent RSSI of the merchant beacon device 130, and saves the subsequent RSSI data pair. In this example, the application 114 determines that the subsequent reverse RSSI and the subsequent RSSI proportionally increase from the first reverse RSSI and first RSSI as the user computing device 110 has moved closer to the merchant beacon device 110.

In block 540, the user computing device 110 determines that the network 120 is secure. In an example embodiment, the application 114 determines that the network 120 is secure based on determining a proportional change in the RSSI values and reverse RSSI values over time. In another example embodiment, the user computing device 110 decrypts a digital signature received from the merchant beacon device 130 and verifies the digital signature as being associated with a trusted merchant system. In this example embodiment, the user 101 may be presented with an option to verify the merchant system associated with the received digital signature. For example, the user 101 may select an object on the user interface 111 to confirm or deny a network 120 connection with the merchant system associated with the digital signature.

The method 230 then proceeds to block 240 in FIG. 2.

Returning to FIG. 2, in block 240, the user computing device 110 determines whether to transact with the merchant system associated with the merchant beacon device 130. In an example embodiment, the user 101 may select an option to initiate a transaction with a merchant POS terminal associated with the merchant system. For example, the user 101 may select the payment application 118 or a web browser 117 payment application on the user computing device 110. In this example, the payment application 118 and or web browser 117 payment application may comprise a digital wallet application, which allows the user 101 to enter financial account information. In this example, the user 101 selects the digital wallet application and initiates a transaction with the merchant POS terminal. In another example embodiment, the merchant POS terminal initiates a transaction with the user computing device 110 payment application 118. In this example embodiment, the user 101 may approve or deny the transaction by selecting a user interface 111 object on the user computing device 110 or may configure the settings of the user computing device 110 to allow a transaction with the merchant beacon device 130 if the network 120 is determined to be secure and the user computing device 110 is within a predefined proximity of the merchant POS terminal. In this example embodiment, the user computing device 110 may determine that the user computing device 110 is within the predefined proximity of the merchant POS terminal if the RSSI of the merchant beacon device 130 located at the merchant POS terminal is more than a threshold value.

As previously discussed, in other example embodiments, the merchant beacon device 130 may not be associated with a merchant system. For example, the merchant beacon device 130 may be associated with a security system or for personal use by a user associated with the user computing device 110. In this example embodiment, the appropriate system or operator configures the merchant beacon device 130 and places the merchant beacon device 130 in a physical location in accordance with the purpose of the merchant beacon device 130. For example, the merchant beacon device 130 may be placed near a door so that when the user computing device 110 determines it has a secure network connection, the door is unlocked. In yet another example embodiment, the merchant beacon device 130 is associated with a merchant system, but is not used for transactional purposes. For example, the merchant beacon device 130 may be placed near an entrance to unlock the entrance when a configured user computing device 110 establishes a secure network connection.

If the user computing device 110 is instructed to transact with the merchant system associated with the merchant beacon device 130, the method 200 proceeds to block 250.

In block 250, the user computing device 110 transacts with the merchant system. In an example embodiment, the user computing device 110 receives transaction information from the merchant system, such as description of the products or services to be purchased by the user 101, the prices of such products or services, and any other appropriate information. In this example embodiment, the user 101 may select a payment option on the user computing device 110 and select an option to approve the transaction. In this example embodiment, the user computing device 110 transmits user 101 financial account information to the merchant POS terminal via Bluetooth low energy, Bluetooth, Wi-Fi, or other network 120 connection. In this example embodiment, the merchant receives the financial account information and sends a request to a payment processing system, such as a credit card issuer or bank associated with a user financial account, to process the transaction.

The method 200 then proceeds to block 260.

Returning to block 240, if the user computing device 110 does not transact with the merchant system associated with the merchant beacon device 130, the method 200 proceeds to block 260. For example, the user does not instruct the user computing device 110 to transact with the merchant system.

In block 260, the user computing device 110 determines whether to continue the network 120 connection. In an example embodiment, the user 101 may cancel the network 120 connection by either selecting a user interface 111 object to disconnect the network 120 connection or by carrying the user computing device 110 out of a predefined proximity of the merchant beacon device 130 necessary to maintain a network 120 connection. In an example embodiment, to maintain a network 120 connection, the user 101 may be presented, by the user computing device 110, with an option to select to continue the network 120 connection. In another example embodiment, if the user 101 does not carry the user computing device 110 out of a predefined proximity of the merchant beacon device 130 necessary to maintain a network 120 connection, the user 101 does not have to select any option on the user computing device 110 to continue the network 120 connection.

If the user computing device 110 continues the network 120 connection, the method 200 proceeds to block 220. In an example embodiment, the user computing device 110 continues to receive data comprising subsequent reverse RSSI values from the merchant beacon device 130, determine the subsequent RSSI of the merchant beacon device 130, and save subsequent RSSI data pairs. In this example embodiment, the application 114, after saving each subsequent RSSI data pair, determines whether a correspondence does exist between the RSSI values and reverse RSSI values in the two most recent RSSI data pairs.

Returning to block 260, if the user computing device 110 does not continue the network 120 connection, the method 200 proceeds to block 270.

In block 270, the network 120 connection is terminated. In an example embodiment, the user computing device 110 does not send or receive data over the network 120 after the connection is terminated. In another example embodiment, the user computing device 110 may establish network 120 connections with other network 120 devices except for the merchant beacon device 130. For example, the user computing device 110 places the merchant beacon device 130 on a restricted list of network 120 devices with which the user computing device 110 may not establish a network 120 connection. In an example embodiment, the user 101 may select one or more options on the user interface 111 to reestablish a network 120 connection or return to the predefined proximity required to maintain a network 120 connection with the merchant beacon device 130.

As discussed previously, other proxies can be utilized to estimate the distance between two network 120 devices, for example, the free space path loss, the received channel power indicator ("RCPI"), the time of arrival ("TOA"), or any other appropriate measure to estimate the distance between the network 120 devices. In these examples, measurements of the proxy substitute for the measurement of RSSI values. Accordingly, the user computing device 110 and merchant beacon device 130 measure the relevant values and use those values in a manner similar to the RSSI values, as discussed previously.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to secure a network connection, comprising:

receiving, by a user computing device at a first time, a first set of data from a beacon device, the first set of data comprising a first reverse signal strength indicator, the first reverse signal strength indicator comprising a signal strength indicator of the user computing device as determined by the beacon device;

determining, by the user computing device at the first time, a first signal strength indicator in response to the receiving the first set of data, the first signal strength indicator comprising a signal strength indicator of the beacon device as determined by the user computing device;

receiving, by the user computing device, at a second time after determining the first signal strength indicator, a second set of data from the beacon device, the second set of data comprising a second reverse signal strength indicator from the beacon device, the second reverse signal strength indicator comprising a second signal strength indicator of the user computing device as determined by the beacon device at a time after the user computing device determines the first signal strength indicator;

determining, by the user computing device, a second signal strength indicator in response to the receiving of the second set data, the second signal strength indicator comprising a second signal strength indicator of the beacon device as determined by the user computing device; comparing, by the user computing device, a change in the first signal strength indicator with respect to the second signal strength indicator to a change in the first reverse signal strength indicator with respect to the second reverse signal strength indicator;

determining, by the user computing device, a correspondence between the change in the first signal strength indicator with respect to the second signal strength indicator and the change in the first reverse signal strength indicator with respect to the second reverse signal strength indicator, the correspondence comprising a proportional change in magnitude; and transacting, by the user computing device, with a merchant system associated with the beacon device in response to determining the correspondence.

2. The method of claim 1, further comprising:

determining, by the user computing device at a third time after proceeding with the transaction, that there is not a correspondence in the change in the first signal strength indicator with respect to the second signal strength indicator and the change in the first reverse signal strength indicator with respect to the second reverse signal strength indicator; and terminating, by the user computing device, a network connection between the user computing device and the beacon device in response to determining at the third time that there is not a correspondence.

3. The method of claim 1, further comprising:

detecting, by the beacon device, movement of the beacon device; and terminating, by the beacon device, a network connection between the beacon device and the user computing device in response to detecting movement of the beacon device.

4. The method of claim 3, wherein the movement of the beacon device is detected via an accelerometer residing on the beacon device.

5. The method of claim 1, wherein the first set of data and the second set of data further comprise advertising data.

6. The method of claim 1, wherein the beacon device comprises Bluetooth low energy beacon.

7. The method of claim 1, wherein the first set of data and the second set of data further comprise a digital signature created by the beacon device via a private cryptographic key residing within a secure memory of the beacon device, and wherein the method further comprises:

receiving, by the user computing device, a public cryptographic key from the beacon device;

decrypting, by the user computing device via the public cryptographic key, the digital signature; and verifying, by the user computing device, that the digital signature corresponds to a merchant system with which the user computing device intends to transact.

8. A computer program product, comprising:

a non-transitory computer-readable medium having computer-readable program instructions embodied thereon that when executed by a user computing device cause the user computing device perform operations to secure a network connection, the operations comprising:

receiving a first set of data from a beacon device, the first set of data comprising a first reverse signal strength indicator, the first reverse signal strength indicator comprising a signal strength indicator of the user computing device as determined by the beacon device;

determining a first signal strength indicator in response to the receiving the first set of data, the first signal strength indicator comprising a signal strength indicator of the beacon device as determined by the user computing device;

receiving, at a second time after determining the first signal strength indicator, a second set of data from the beacon device the second set of data comprising a second reverse signal strength indicator from the beacon device, the second reverse signal strength indicator comprising a second signal strength indicator of the user computing device as determined by the beacon device at a time after the user computing device determines the first signal strength indicator;

determining a second signal strength indicator in response to the receiving of the second set data, the second signal strength indicator comprising a second signal strength indicator of the beacon device as determined by the user computing device;

comparing a change in the first signal strength indicator with respect to the second signal strength indicator to a change in the first reverse signal strength indicator with respect to the second reverse signal strength indicator;

determining a correspondence between the change in the first signal strength indicator with respect to the second signal strength indicator and the change in the first reverse signal strength indicator with respect to the second reverse signal strength indicator, the correspondence comprising a proportional change in magnitude; and transacting with a merchant system associated with the beacon device in response to determining the correspondence.

9. The computer program product of claim 8, wherein the operations further comprise establishing a wireless network connection between the user computing device and the beacon device.

10. The computer program product of claim 8, wherein the operations further comprise:

receiving at a third time after proceeding the transaction, a notification from the beacon device of a detection of movement of the beacon device; and terminating the wireless network connection based on receiving the notification of the detection of movement.

11. The computer program product of claim 10, wherein the movement of the beacon device is detected via an accelerometer residing on the beacon device.

12. The computer program product of claim 8, wherein the wireless network device comprises Bluetooth low energy device.

13. The computer program product of claim 8, wherein the first data and the second data further comprise a digital signature created by the beacon device via a private cryptographic key residing within a secure element of the beacon device, and wherein the operations further comprise:

receiving a public cryptographic key from the beacon device;

decrypting, via the public cryptographic key, the digital signature; and verifying that the digital signature corresponds to a merchant system with which the user intends to transact.

14. A user computing device to secure a network connection, comprising:

a storage device; and a processor communicatively coupled to the storage device, wherein the processor executes application code instructions that are stored in the storage device to cause the processor to perform operations comprising:

receiving a first set of data from a beacon device, the first set of data comprising a first reverse signal strength indicator, the first reverse signal strength indicator comprising a signal strength indicator of the user computing device as determined by the beacon device;

determining a first signal strength indicator in response to the receiving the first set of data, the first signal strength indicator comprising a signal strength indicator of the beacon device as determined by the user computing device;

receiving at a second time after determining the first signal strength indicator a second set of data from the beacon device, the second set of data comprising a second reverse signal strength indicator from the beacon device, the second reverse signal strength indicator comprising a second signal strength indicator of the user computing device as determined by the beacon device at a time after the user computing device determines the first signal strength indicator;

determining a second signal strength indicator in response to the receiving of the second set data, the second signal strength indicator comprising a second signal strength indicator of the beacon device as determined by the user computing device;

comparing a change in the first signal strength indicator with respect to the second signal strength indicator to a change in the first reverse signal strength indicator with respect to the second reverse signal strength indicator;

determining a correspondence between the change in the first signal strength indicator with respect to the second signal strength indicator and the change in the first reverse signal strength indicator with respect to the second reverse signal strength indicator, the correspondence comprising a proportional change in magnitude; and transacting with a merchant system associated with the beacon device in response to determining the correspondence.

15. The user computing device of claim 14, wherein the operations further comprise establishing a wireless network connection between the user computing device and the beacon device.

16. The user computing device of claim 14, wherein the operations further comprise:
  determining at a third time after proceeding with the transaction that the change in the first and second signal strength indicators is not proportional to the change in the first and second reverse signal strength indicators; and
  terminating a wireless network connection between the user computing device and the beacon device in response to determining that the change in the first and second signal strength indicators is not proportional to the change in the first and second reverse signal strength indicators.

17. The user computing device of claim 14, wherein the operations further comprise:
  receiving, at a third time after allowing the transaction, a notification from the beacon device of a detection of movement of the beacon device; and
  terminating a wireless network connection between the user computing device and the beacon device in response to receiving the notification from the beacon device.

18. The user computing device of claim 17, wherein the beacon device comprises a Bluetooth low energy beacon.

19. The computer program product of claim 8, wherein the first set of data and the second set of data further comprise advertising data.

20. The user computing device of claim 14, wherein the first set of data and the second set of data further comprise advertising data.

* * * * *